Feb. 10, 1925. Re. 15,994
R. M. SMITH
FLYING MACHINE
Original Filed Sept. 30, 1909
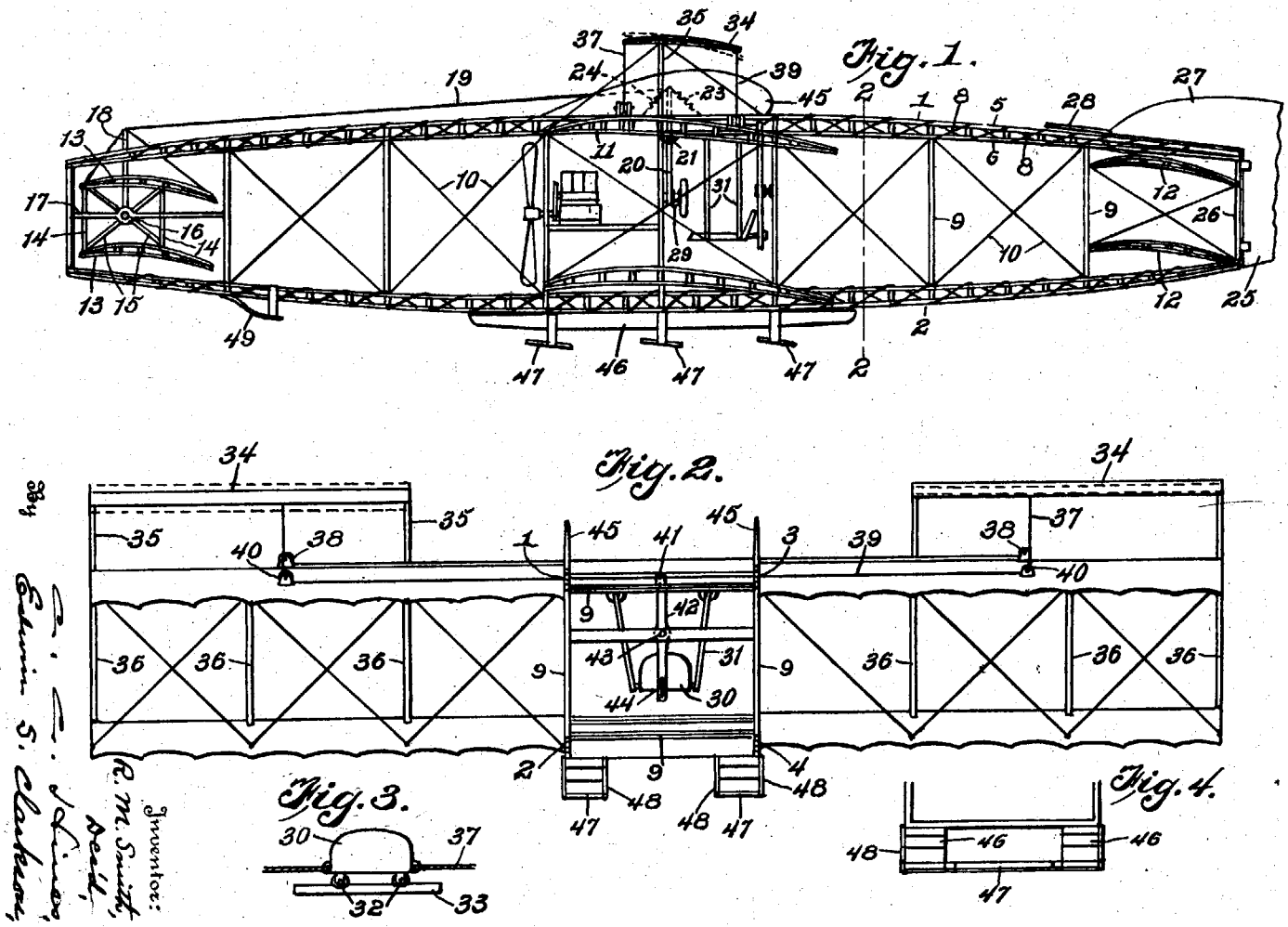
Inventor:
R. M. Smith,
Dec'd,
C. C. Lines,
By Edwin S. Clarkson,
Attorneys.

Reissued Feb. 10, 1925. Re. 15,994

UNITED STATES PATENT OFFICE.

REXFORD M. SMITH, DECEASED, LATE OF WASHINGTON, DISTRICT OF COLUMBIA; BY THE CONNECTICUT AIRCRAFT COMPANY, OF NEW HAVEN, CONNECTICUT, ASSIGNEE.

FLYING MACHINE.

Original No. 1,398,922, dated November 29, 1921, Serial No. 520,240, filed September 30, 1909. Application for reissue filed November 27, 1923. Serial No. 677,302.

*To all whom it may concern:*

Be it known that REXFORD M. SMITH, deceased, late a citizen of the United States, and a resident of Washington, District of Columbia, did invent new and useful Improvements in Flying Machines, of which the following is a specification.

This invention relates to flying machines of the heavier than air type, one of the main objects of the invention being to provide reliable means for maintaining a perfect equilibrium in the air without mental effort and without either voluntary or involuntary physical effort on the part of the aviator.

A further object of the invention is to provide means for supporting the machine upon the surface of water and rendering it practical to ascend from the surface of the water and alight thereon.

With the above and other objects in view, the nature of which will more fully appear as the description proceeds, the invention consists in the novel construction, combination and arrangement of parts as herein fully described, illustrated and claimed.

In the accompanying drawings:—

Figure 1 is a side elevation of a flying machine embodying the present invention.

Fig. 2 is a vertical cross section through the same on the line 2—2 of Fig. 1 looking forward.

Fig. 3 is a detail rear elevation of the aviator's seat showing a slight modification.

Fig. 4 is an end elevation of the hydroplane showing a modified arrangement of lifting surface.

The frame of the machine which extends fore and aft, comprises the four main longitudinal bars 1, 2, 3 and 4, each of which, as shown in Fig. 1, comprises a pair of members or strips 5 and 6, which are preferably connected together at their opposite ends, at the bow and stern of the machine, the said members or strips being spaced apart by means of transverse struts 7 arranged at suitable intervals, while between the struts, the members 5 and 6 are connected and held together and braced by diagonal truss wires 8. This makes a strong and exceedingly light frame bar admirably adapted for the support of the front and rear planes and controlling devices. 9 designates stanchions or cross bars connecting the main longitudinal frame bars 1 and 2 at suitable intervals, while 10 designates diagonal truss wires for bracing the frame.

The main lifting and supporting wings 11 project laterally outward from the central portion of the main frame, being arranged one above the other as shown in Figs. 1 and 2, thus making the machine, in the illustrated embodiment, of the biplane type. Arranged at the rear of the main frame, are the rear or tail planes 12, preferably two in number, arranged one above the other, and mounted in fixed relation to the frame. It will be observed that these planes 12 are preferably curved so as to constitute auxiliary lifting planes, thereby adapting them to compensate for the weight of the rear portion of the main frame and assist the main planes 11 in the uplift of the machine.

The front planes 13, arranged at the forward end of the main frame, are also preferably curved from front to rear for a similar purpose and are connected together for simultaneous movement by stanchions 14 and also, if desired, by diagonal braces 15. The frame work connecting the front planes 13 is pivotally mounted at 16 on a suitable supporting frame bar 17 and provided with an operating lever arm 18 from which a connecting bar or rod 19 extends rearward where it is pivotally connected to the upper end of a control lever 20 fulcrumed at 21, intermediate its ends and having a hand wheel 22 mounted and journaled on the lower end thereof as shown in Fig. 1. The lever 20 is held in a central or neutral position by any suitable means such as opposing springs 23 and 24 which permit the lever to be vibrated either forward or backward to operate the connecting rod 19 and thereby vary the angle of inclination of the front planes 13 in order to ascend or descend.

Connected pivotally to the rear end of each of the side members of the main frame is a rudder 25, the same being mounted on a vertical axis or hinge rod 26 so as to swing horizontally. Each rudder is provided with a forward extension 27 which acts as a partial counter-balance for the main body of the rudder. The two rudders 25, which are arranged in transverse alinement with each other, will, in practice, probably be connected together so as to move in unison and maintain their parallelism and one or both of said rudders will be provided with a tiller arm 28 from which a suitable flexible connection, (not shown) will extend to a drum or pulley 29 on the hub of the controller wheel 22. The operating connections for the rudders 25 and the front planes 13 will all be connected to and be controlled by the wheel 22 so that by turning said wheel to the right, the rudders will be positioned at any angle adapting them to steer the machine to the right and vice versa and by pressing the wheel 22 forward the planes 13 will be inclined to direct the machine upward, while, by moving the wheel 22 backward, the planes 13 will be inclined so as to direct the machine downward.

The aviator's seat 30 is mounted so that it is free to move laterally with respect to the length of the machine. This seat may either be mounted on suspending swing links 31 as shown in Figs. 1 and 2 or it may be mounted on caster wheels or rollers 32 adapted to travel on one or more track rails 33. The object in making the aviator's seat movable is to automatically control the lateral balancing planes 34 which are preferably arranged above the upper main plane 11 as shown in Figures 1 and 2 and pivotally mounted on extensions 35 of the stanchions 36 which connect the upper and lower main planes 11. From the forward edge of one of the planes 34, a flexible connection or cable 37 extends around pulleys 38 to the corresponding front edge of the other plane 34. Another flexible connection or cable 39 extends from the rear part of one of the planes 34 around suitable guide pulleys 40 to the other balancing plane 34. At an intermediate point the connection or cable 39 is attached at the point 41 to the upper arm of a lever 42 fulcrumed at 43 and having a jointed connection at 44 with the aviator's seat. It will now be apparent that as the machine starts to incline to one side or the other, the relative movement between the machine frame and the aviator's seat will effect a pull on one of the flexible connections referred to, thereby effecting a corresponding variation in the angles of the lateral balancing planes, causing the latter to counteract instantly the tendency of the machine to list or incline away from a true horizontal plane. This is accomplished without any mental effort whatever on the part of the aviator and also without voluntary or involuntary physical effort on his part. 45 designates centrally located vertical fins for maintaining the direction of travel of the machine and overcoming lateral leeway.

Arranged at the bottom of the main frame of the machine is a hydroplane support which is shown as consisting of a pair of floats 46 secured to the undersides of the lower frame bars 2 and 4. Each of said floats, which is preferably closed on all sides and practically air tight and water tight at all points, is provided with a plurality of hydroplane surfaces 47 shown as consisting of plates set at a suitable inclination as shown in Fig. 1 and held supported beneath the floats and at a suitable distance therefrom by means of hanger bars 48 secured to opposite sides of the floats. If desired, the hydroplane surfaces or plates 47 may extend entirely across between the floats and connect and tie the same together as shown in Fig. 4. The floats 46 support the machine as a whole on the surface of the water while the hydroplane surfaces 47 are submerged. As these hydroplanes or plates consist preferably of thin plates of steel or aluminum or other metal brought to a sharp edge at the front they offer a minimum resistance to the forward movement of the machine and at the same time effect a very considerable uplift by the resistance of the water against the undersides thereof, the result being that the floats soon rise clear of contact with the water thereby practically eliminating nearly all of the skin friction of the water and enabling the machine to quickly attain a velocity sufficient to clear the water and rise therefrom, after which the hydroplanes 47, by reason of their inclination, act upon the air and assist the other planes in the uplift of the machine. In order to safely alight on the surface of the water, one or more additional hydroplanes 49 may be secured to the underside of the forward portion of the machine frame as shown in Fig. 1, the same being adapted to come in contact with the surface of the water and uphold the front portion of the frame while the floats 46 and hydroplanes 47 are settling to their proper level.

Instead of employing the lever 42 above referred to, the flexible connection 39 or the connection 37 may be passed around guide pulleys and connected directly to the aviator's seat 30 as indicated in Fig. 3.

Having thus fully described my invention, I claim:—

1. A combined air and marine craft comprising in combination, a body or frame, a biplane aerial supporting surface carried thereby, two main sustaining pontoons on the underside of said body, said pontoons being disposed close to and at opposite sides of the center of said body below the level of said aerial supporting surface, said pontoons extending lengthwise in a fore-and-aft direction parallel with each other and with the line of flight, means for propelling the craft in the air and on the water and lifting the craft from the water into the air, adjustable controlling means for steering the craft and maintaining its longitudinal and lateral stability, and a pair of fixed centrally located parallel vertical fins in vertical alinement with the outer walls of the pontoons, said fins being arranged above the upper plane of the biplane aerial supporting surface on opposite sides of the longitudinal axis of the machine and parallel with the line of flight for maintaining the direction of travel of the craft and overcoming lateral leeway.

2. A combined air and marine craft comprising in combination, a body or frame, a biplane aerial supporting surface carried thereby, two main sustaining pontoons on the underside of said body, said pontoons being disposed close to and at opposite sides of the center of said body below the level of said biplane aerial supporting surface, said pontoons extending lengthwise in a fore-and-aft direction parallel with each other and with the line of flight, means including a motor and propeller, for propelling the craft in the air and on the water and inclined planing surfaces on the pontoons coacting with said motor and propeller for lifting the craft from the water into the air, adjustable controlling means for steering the craft and maintaining its longitudinal and lateral stability, and a pair of fixed centrally located parallel vertical fins, said fins being arranged above the upper plane of the biplane aerial supporting surface in vertical alinement with the outer walls of the pontoons and on opposite sides of the longitudinal axis of the machine and parallel with the line of flight for maintaining the direction of travel of the craft and overcoming lateral leeway.

3. A combined air and water craft embodying a main frame, a head frame, a tail frame, a main aerial supporting surface carried by the main frame, an auxiliary aerial supporting surface carried by the tail frame, a waterborne base comprising a plurality of pontoons carried by the main frame beneath said main aerial supporting surface and below the level and in advance of said auxiliary aerial supporting surface, motor driven means for propelling the craft, means for guiding the craft and maintaining the longitudinal and lateral equilibrium thereof, a pair of fixed vertical stability fins arranged parallel with the line of flight above the level of the main aerial supporting surface and respectively in vertical alinement with the outer walls of the waterborne base, and a hydroplane surface upon the base of the head frame separate from and arranged in advance of the bow of the waterborne base.

4. A combined air and water craft embodying a main frame of rectangular form in cross-section and including upper and lower longitudinal frame bars and uprights connecting the same, a biplane aerial supporting surface comprising superposed wings extending laterally from said frame, motor driven means for propelling the craft, means for guiding the craft and maintaining the longitudinal and lateral equilibrium thereof, a waterborne base for the craft comprising pontoons arranged at the lower corners of the frame and extending below the level of the lower wings of the aerial supporting surface, the wings of both supporting surfaces and the pontoons being rigidly joined to the frame bars and the superposed frame bars rigidly joined and reinforced by the uprights, and fixed vertical stability fins extending from the upper corners of the rectangular main frame above the leved of the upper wings of the aerial supporting surface, each fin being arranged above and in vertical alinement with a pontoon.

In testimony whereof the assignee corporation herewith affixes its signature and seal by its duly authorized officer.

[L. S.] THE CONNECTICUT AIRCRAFT COMPANY,
By SAMUEL C. MOREHOUSE,
*Treasurer.*